(12) United States Patent
Dorr

(10) Patent No.: US 6,514,443 B1
(45) Date of Patent: Feb. 4, 2003

(54) METHOD FOR MANUFACTURING A BALL JOINT

(75) Inventor: Christoph Dorr, Meerbusch (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 818 days.

(21) Appl. No.: 08/626,488

(22) Filed: Apr. 2, 1996

(30) Foreign Application Priority Data

Apr. 11, 1995 (DE) .......................... 195 13 693

(51) Int. Cl.⁷ ............................................ B29C 45/00
(52) U.S. Cl. ...................... 264/130; 264/242; 264/264
(58) Field of Search .............................. 264/130, 242, 264/264

(56) References Cited

U.S. PATENT DOCUMENTS

| | | | | |
|---|---|---|---|---|
| 2,954,992 A | * | 10/1960 | Baker | 264/242 |
| 3,089,198 A | * | 5/1963 | Eirhart, Jr. | 264/242 |
| 3,218,383 A | * | 11/1965 | White | 264/242 |
| 3,263,013 A | | 7/1966 | Morin | |
| 4,264,001 A | * | 4/1981 | Jensen et al. | 198/344 |
| 4,290,181 A | * | 9/1981 | Jackson | 264/264 |
| 4,693,628 A | * | 9/1987 | Renk | 403/135 |
| 5,352,059 A | * | 10/1994 | Ueno et al. | 403/122 |

FOREIGN PATENT DOCUMENTS

| | | | |
|---|---|---|---|
| GB | 976410 | 11/1964 | |
| GB | 1121004 | 7/1968 | |
| JP | 062361 | * 8/1977 | 264/242 |

* cited by examiner

*Primary Examiner*—Mark Eashoo
(74) *Attorney, Agent, or Firm*—Tarolli, Sundheim, Covell, Tummino & Szabo L.L.P.

(57) ABSTRACT

A method for manufacturing a ball joint (2) consisting of a ball-ended spindle (21) and a socket (29), having no bearing shell and being already assembled during the manufacture includes, placing the ball-ended spindle (21), which comprises a ball (23) without a flattened pole surface, into an injection molding tool (1). The ball-ended spindle (21) is retained by a core puller (13) that seals a hollow space of the injection molding tool (1) relative to the ball (23) and simultaneously forms a clearance (4) for realizing a maximum pivoting angle of the ball-ended spindle (21) relative to the socket (29), whereafter the ball (23) is directly coated with plastic by means of injection molding so as to form the socket (29).

4 Claims, 1 Drawing Sheet

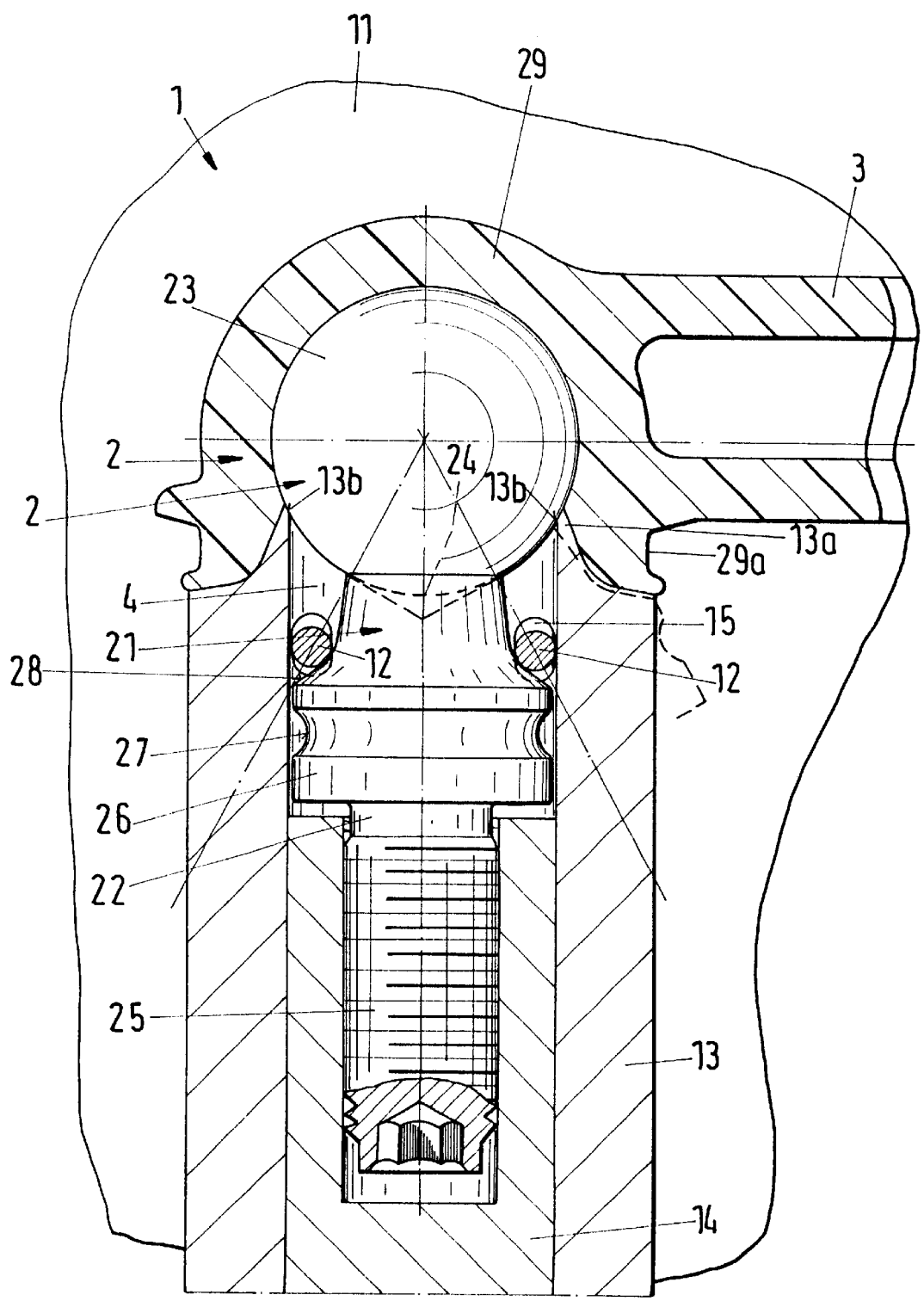

METHOD FOR MANUFACTURING A BALL JOINT

The invention pertains to a method for manufacturing a ball joint consisting of a ball-ended spindle and a socket, in particular a ball joint for motor vehicles.

Ball joints, in particular ball joints for motor vehicles, are known in numerous variations. These ball joints consist of a ball-ended spindle and a socket, inside of which the ball of the ball-ended spindle is arranged such that it can be pivoted and turned to a limited extent. A bearing shell is usually arranged between the socket and the ball of the ball-ended spindle in order to attain the desired mating of material and quality of the ball seat independent of the preferably metallic material of the socket.

These known ball joints which comprise a bearing shell have the disadvantage that a plastic deformation of the bearing shell and, if necessary, the socket is required during the insertion of the ball-ended spindle into the socket so as to attain the required overlap between the bearing shell and the equator of the ball. This overlap is necessary for preventing the ball-ended spindle from being torn out of the socket if loads are exerted in the longitudinal direction of the ball-ended spindle.

Since the assembly of these known ball joints requires a relatively high expenditure, it was already proposed to manufacture the socket by coating a ball-ended spindle by means of injection molding in an injection molding tool, wherein the ball is provided with a bearing shell that is manufactured separately prior to the injection molding process. Although this bearing shell is attached to the ball in the form of a press fit, it is difficult to prevent the plastic which is supplied under pressure from being admitted between the ball and the bearing shell during the manufacture of the socket such that the ball joint is rendered unusable due to the fact that the hollow spaces, in particular the flattened pole surface of the ball, are filled with said plastic material. If a fiber-reinforced plastic material is used for manufacturing a housing that is able to withstand high loads, the bearing shell would remain ineffective and consequently become unnecessary.

The present invention is based on the objective of developing a method and a device for manufacturing a ball joint consisting of a ball-ended spindle and a plastic socket which allow the inexpensive manufacture of ball joints that are able to withstand high loads while eliminating the aforementioned disadvantages.

According to the invention, this objective is attained by placing the ball-ended spindle that comprises a ball without a pole surface into an injection molding tool and retaining said ball-ended spindle by a core puller that seals the hollow spaces of the injection molding tool relative to the ball and simultaneously forms a clearance for realizing the maximum pivoting angle of the ball-ended spindle relative to the socket, whereafter the ball is directly coated with plastic, preferably a fiber-reinforced plastic, by means of injection molding so as to form the socket.

The method according to the invention makes it possible to manufacture a ball joint consisting of a ball-ended spindle and a socket in which not only the complicated assembly, but also the entire bearing shell is eliminated. In this way, the risk of creating tolerances with respect to the ball seat, in particular dimensional deviations from the spherical shape, is simultaneously eliminated. The direct coating of the ball by means of injection molding so as to form the socket consequently results in a superior contact pattern and a high-percentage contact area of the ball joint. Since a sufficient overlap between the high-strength socket material and the equator of the ball can be attained despite the elimination of the bearing shell, the ball joint manufactured in accordance with the invention provides a high stability against tearing if the ball-ended spindle out of the socket, i.e., a significant advantage as compared to known ball joints with plastic bearing shells that consequently have a lesser stability against tearing of the ball-ended spindle out of the socket is attained. Since the ball joint manufactured in accordance with the invention also has a low radial and axial elasticity, said ball joint can be utilized as an axial as well as a radial joint. Due to the fact that the bearing shell is eliminated, the ball joint according to the invention can also be realized with smaller external dimensions of the socket.

According to one additional characteristic of the invention, the connection piece of the socket or a complete chassis strut can be manufactured in the injection molding tool simultaneously with the socket. The invention additionally proposes producing a groove that surrounds the opening of the socket and serves for holding a sealing bellows simultaneously with the manufacture of the socket.

According to one additional characteristic of the invention, the ball-ended spindle that is provided with a ball without a pole surface is manufactured by welding a ball onto the recessed surface of the spindle part. The preferred welding method utilized for this purpose is either the pulsed-current arc welding method or the friction welding method. According to the invention, the ball can be provided with an antifriction coating before the injection molding process.

The device for implementing the method according to the invention consists of an injection molding tool that comprises a hollow space which corresponds with the socket including its connection piece or chassis strut and forms a guide for a core puller. One embodiment of the device according to the invention is characterized by the fact that the core puller which is guided in a sealed fashion relative to the injection molding tool is provided with an annular sealing surface that adjoins the underside of the ball in a sealed fashion, with said sealing surface being formed at the end of the core puller that has the shape of a truncated cone and forms the clearance for realizing the maximum pivoting angle of the ball-ended spindle relative to the socket.

With this design according to the invention, one obtains a simple and functionally safe injection molding tool that not only allows the manufacture of the socket that directly surrounds the ball, but also the simultaneous manufacture of the clearance required for moving the ball-ended spindle relative to the socket by the maximum pivoting angle.

According to one preferred embodiment of the device according to the invention, the injection molding tool can be divided along the longitudinal center of the socket and the core puller, wherein the core lies in the tool partition plane such that one half cylinder is situated in each respective tool half. Consequently, the ball joint with an integrally formed groove for the sealing bellows and an open strut profile of the connection piece can be removed from the mold without additional core pullers or slides.

According to one additional characteristic of the invention, holding pins can be arranged in one of the injection molding tool halves as contact surfaces for the spindle part of the ball-ended spindle in order to generate the required force for counteracting that particular force with which the annular sealing surface is pressed against the underside of the ball and prevent the plastic material from being admitted into the clearance during the injection molding of the socket. Alternatively, this counter force can also be generated by a core via the threaded section of the ball-ended spindle.

One embodiment of the device according to the invention is illustrated in the figure in the form of a vertical section through the tool partition plane. This illustration also serves for the following description of the method according to the invention.

The figure schematically shows part of an injection molding tool 1 that serves for manufacturing a ball joint 2 that, in particular, is intended for motor vehicles.

This ball joint 2 consists of a ball-ended spindle 21 that is composed of a spindle part 22 and a ball 23. The ball 23 is formed as a ball without a pole surface which is welded onto the recessed surface 24 of the ball-ended spindle 21 by means of pulsed-current arc welding or friction welding.

A collar 26 is situated adjacent to the threaded section 25 of the ball-ended spindle 22 in the direction toward the ball 23. An annular groove 27 that serves for accommodating the reinforced edge of a sealing bellows that is not illustrated in the figure is arranged in the cylindrical outer surface of this collar 26. A conical transition 28 of the ball-ended spindle 21 is situated between the collar 26 and the recessed surface 24. The ball 23 is provided with an antifriction coating that produces a lubricating film and a lubricating gap during the initial pivoting movements of the ball-ended spindle 21.

In the embodiment shown, the socket 29 that accommodates the ball 23 of the ball-ended spindle 21 is realized integrally with a connection piece 3 or a complete chassis strut. In order to allow the pivoting of the ball-ended spindle 21 by the maximum pivoting angle that is indicated in the figure by dot-dash lines, a clearance 4 is formed within the opening of the socket 29. The right end position of the ball-ended spindle 21 is indicated by broken lines. The edge of the socket 29 that surrounds the clearance 4 is provided with a groove 29a that accommodates the other end of the sealing bellows that is not illustrated in the figure.

In order to manufacture the socket 29 of a suitable plastic material, the ball-ended spindle 21 that consists of the spindle part 22 and the ball 23 is placed into the core 14 of the injection molding tool 1 that, for example, is divided along the longitudinal center of the socket 29, i.e., in the plane of projection of these embodiment. Consequently, the figure only shows one half 11 of the injection molding tool 1. Two holding pins 12 that extend through oblong holes 15 in the core puller 13 when the tool is closed are arranged in the other half 11 of the injection molding tool 1. The conical transition 28 of the ball-ended spindle 21 adjoins these holding pins when the core puller 13 is moved upward in the direction of the axis of the ball-ended spindle, i.e., into the end position shown, in order to form a seal.

The core puller 13 has a tubular shape and is guided in a sealed fashion inside a bore (formed of two half cylinders in each respective half of the mold) in the injection molding tool 1. The core puller surrounds the spindle part 22 of the ball-ended spindle 21 and has a conical end 13a, the outer contour of which forms the border of the clearance 4. The core puller 13 adjoins the underside of the ball 23 with an annular sealing surface 13b in the end position shown in the figure. The sealing force exerted on the ball 23 via this sealing surface 13b is compensated for by a counterforce that is transmitted from the transition 28 of the spindle part 22 to the injection molding tool 1 via the holding pins 12.

After placing the ball-ended spindle 21 into the injection molding tool 1 and moving the core puller 13 into the end position shown in the figure, plastic is introduced under high pressure into the hollow space of the injection molding tool 1 such that the socket 29, which is illustrated in the form of a section, as well as the integrally formed connection piece 3 or integrally formed chassis strut is attained. A socket 29 that is manufactured in this fashion directly surrounds the ball 23 of the ball-ended spindle 21, i.e., a bearing shell is eliminated. Consequently, an assembled ball joint can be removed from the injection molding tool 1 after the core puller 13 is alleviated, the injection molding tool 1 is opened such that the holding pins 12 are retracted and the core puller 13 is moved into its original position. The clearance 4 required for pivoting the ball-ended spindle 21 relative to the socket 29 is simultaneously formed during the manufacture of the socket 29 by the end 13a of the core puller 13 which has the shape of a truncated cone. The maximum pivoting angle is indicated in the figure by dot-dash lines.

After removing the finished ball joint from the injection molding tool 1, the ball simply has to be loosened by pivoting the ball-ended spindle, the clearance 4 in the housing 2 provided with a lubricant and the sealing bellows, which is not shown in the figure placed into the groove 29a of the socket 29 with its upper edge and into the annular groove 27 in the collar 26 of the ball-ended spindle 21 with its lower edge. Subsequently, the ball joint with a connection piece 3 or chassis strut that is integrally formed on the socket 29 is ready for installation.

LIST OF REFERENCE NUMERALS

1 Injection molding tool
2 Ball joint
3 Connection piece
4 Clearance
11 Half
12 Holding pin
13 Core puller
13a End
13b Sealing surface
14 Core
15 Oblong hole
21 Ball-ended spindle
22 Spindle part
23 Ball
24 Surface
25 Threaded section
26 Collar
27 Annular groove
28 Transition
29 Socket
29a Groove

What is claimed is:

1. A method for manufacturing a ball joint, the ball joint including a ball-ended spindle (21) having a ball (23) without a pole surface and a socket (29) with a connection piece or complete chassis strut, said method comprising the steps of:

providing an injection molding tool (1) having a hollow space and a tubular core (14) extending into the hollow space, part of the hollow space defining a volume of the socket (29) with the connection piece (3) or complete chassis strut;

surrounding the core (14) with a core puller (13) that extends into the hollow space of the injection molding tool (1);

placing a spindle part (22) of the ball-ended spindle (21) into the tubular core (14) such that the ball (23) of the ball-ended spindle (21) is positioned in the hollow space of the injection molding tool (1);

moving the core puller (13) relative to the core (14) so that the core puller (13) sealingly engages the ball (23) of the ball-ended spindle (21) and the core puller (13) is guided, in a sealed fashion, through a bore provided in the injection molding tool (1);

filling the part of the hollow space of the injection molding tool (1) defining the volume of the socket (29) with the connection piece (3) or complete chassis strut with plastic material to directly coat the ball (23) of the ball-ended spindle (21) and simultaneously form the socket (29) and the connection piece (3) or complete chassis strut; and preventing plastic material from passing between the core puller (13) and the ball (23) of the ball-ended spindle (21) to define a clearance (4) for enabling pivotal movement of the ball-ended spindle (21) relative to the socket (29).

2. The method of claim 1 wherein the step of moving the core puller (13) relative to the core (14) so that the core puller (13) sealingly engages the ball (23) of the ball-ended spindle (21) further includes the steps of:

providing the injection molding tool (1) with holding pins (12);

providing the core puller (13) with oblong holes (15), each oblong hole for receiving a respective holding pin; and moving the ball-ended spindle (21) relative to the injection molding tool (1) until a conical transition (28) of the spindle part (22) of the ball-ended spindle (21) engages the holding pins (12).

3. The method of claim 1 further including the step of:

providing the ball (23) of the ball-ended spindle (21) with an antifriction coating for producing a lubricating gap between the ball (23) and the socket (29) for enabling pivotal movement of the ball-ended spindle (21) within the socket (29).

4. The method of claim 1 further including the steps of:

forming an annular groove (29a) in the socket (29) for receiving a first portion of a sealing bellows; and providing an annular groove (27) in a collar (26) of the spindle part (22) of the ball-ended spindle (21) for receiving a second portion of a sealing bellows.

* * * * *